US011394837B2

(12) United States Patent
Liao et al.

(10) Patent No.: US 11,394,837 B2
(45) Date of Patent: Jul. 19, 2022

(54) SYSTEM AND METHOD USING MATRIX BARCODE INFORMATION TO PROCESS DOCUMENTS

(71) Applicant: AVISION INC., Hsinchu (TW)

(72) Inventors: Chun-Cheih Liao, Hsinchu (TW); Hung-Jen Lin, Hsinchu (TW); Chun-Ping Huang, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/544,048

(22) Filed: Aug. 19, 2019

(65) Prior Publication Data

US 2020/0153980 A1 May 14, 2020

(30) Foreign Application Priority Data

Nov. 9, 2018 (TW) .................................. 107139776

(51) Int. Cl.
*G06F 15/00* (2006.01)
*H04N 1/00* (2006.01)

(52) U.S. Cl.
CPC ....... *H04N 1/00225* (2013.01); *H04N 1/0083* (2013.01); *H04N 1/00228* (2013.01); *H04N 1/00334* (2013.01)

(58) Field of Classification Search
CPC ........... H04N 1/00225; H04N 1/00228; H04N 1/00334; H04N 1/0083
USPC ....................................................... 358/1.15
See application file for complete search history.

(56) References Cited

U.S. PATENT DOCUMENTS

| 9,298,411 B2 * | 3/2016 | Kobayashi | G06F 3/1288 |
| 2008/0252944 A1 * | 10/2008 | Otsuka | H04N 1/00811 358/474 |
| 2009/0090783 A1 * | 4/2009 | Killian | G06Q 20/0855 235/492 |
| 2013/0049959 A1 * | 2/2013 | Wei | G06F 3/1207 340/540 |
| 2014/0002857 A1 | 1/2014 | Huang et al. | |

(Continued)

FOREIGN PATENT DOCUMENTS

| CN | 101394455 A | 3/2009 |
| CN | 102655552 A | 9/2012 |
| CN | 103237359 A | 8/2013 |

(Continued)

*Primary Examiner* — Mark R Milia (57) ABSTRACT

A system and a method using matrix barcode information to process documents are provided. A document-processing apparatus generates matrix barcode information and establishes a wireless link with a mobile apparatus through the matrix barcode information. When the document-processing apparatus establishes the wireless link with the mobile apparatus, the document-processing apparatus creates a file transfer zone, performs a corresponding automatic document-processing action, such as scanning or printing, according to a driving command received from the mobile apparatus, and exchanges the generated image information with the mobile apparatus through the file transfer zone. Given the matrix barcode information, the document-processing apparatus can be directly controlled by the mobile apparatus to achieve direct information exchange and enhanced efficiency and security of the document-processing system.

19 Claims, 7 Drawing Sheets

(56) References Cited

U.S. PATENT DOCUMENTS

2014/0378112 A1* 12/2014 Sugimoto ............ H04B 5/0031
455/418
2015/0249656 A1  9/2015 Wu

FOREIGN PATENT DOCUMENTS

| | | |
|---|---|---|
| CN | 103516927 A | 1/2014 |
| CN | 103916561 A | 7/2014 |
| CN | 104618622 A | 5/2015 |
| CN | 104883343 | 9/2015 |
| CN | 205566375 | 9/2016 |
| CN | 107360614 A | 11/2017 |
| CN | 107833397 A | 3/2018 |
| TW | 201401843 | 1/2014 |

* cited by examiner

SYSTEM AND METHOD USING MATRIX BARCODE INFORMATION TO PROCESS DOCUMENTS

BACKGROUND OF THE INVENTION

1. Field of the Invention

The present invention relates to a system and a method for document processing and, more particularly, to a system and a method using matrix barcode to process documents.

2. Description of the Related Art

In the modernized world, fast-paced life style and work style appear to be a daily routine in the name of efficiency. To take the efficiency of office automation into account, regardless of small and large-sized enterprises, public and private institutions, schools and the like, most of them are equipped with a document-processing apparatus, which includes a scanner, a printer or a multi-function peripheral (MFP) for users to handle document-processing work.

Since the document-processing apparatus is provided to simultaneously serve multiple persons, if intending to output a document from a personal mobile device, such as a mobile phone, tablet personal computer (PC), notebook computer, and the like, a user must upload the document in the mobile device to a cloud server. After the uploading is done, the user further operates the mobile device to configure the document-processing apparatus so as to download the document from the cloud server, and instructs the document-processing apparatus to print to the document. When another user intends to output another document, inevitable repeated operation and configuration simply make the document-processing apparatus cumbersome and time-consuming in processing documents.

Furthermore, if intending to convert a document in the nearby into an image file, the user needs to store the document in the mobile device to facilitate reading, browsing and carrying of the document. Similarly, the user also needs to operate the mobile device and configure the document-processing apparatus in the first place. After finishing scanning of the document, the document-processing apparatus sends the image file to the cloud server. Then again, the user is required to log in the cloud server through the mobile device and download the image file from the cloud server. Likewise, the scanning job is as cumbersome and time-consuming as the printing job. From the perspective of users, both printing and scanning jobs through the conventional document-processing apparatus are not convenient.

SUMMARY OF THE INVENTION

An objective of the present invention is to provide a system and a method using matrix barcode information to process documents which allow user's mobile apparatus to directly control document-processing equipment and exchange information with the document-processing equipment by utilizing wireless transmission technique, and enhance efficiency and security of the document-processing system.

To achieve the foregoing objective, the system using matrix barcode information to process documents includes a document-processing apparatus and a mobile apparatus.

The document-processing apparatus has a first application program installed therein to generate matrix barcode information.

The mobile apparatus has a second application program installed therein to capture the matrix barcode information and to establish a wireless link with the document-processing apparatus.

When the mobile apparatus establishes the wireless link with the document-processing apparatus, the first application program of the document-processing apparatus creates a file transfer zone, performs a corresponding automatic document-processing action according to a driving command received from the mobile apparatus, generates at least one piece of image information for document, and instantly performs information exchange with the mobile apparatus through the file transfer zone.

As can be seen from the above-mentioned structure, a user just needs to hold the mobile apparatus to approach the document-processing apparatus, and the second application program in the mobile apparatus directly captures the matrix barcode information generated by the first application program in the document-processing apparatus to establish the wireless link between the mobile apparatus and the document-processing apparatus. The document-processing apparatus performs a corresponding automatic document-processing action according to the driving command issued by the mobile apparatus to perform instant information exchange through the file transfer zone. By virtue of the matrix barcode information, the document-processing apparatus can be directly controlled by the mobile apparatus for instant information exchange, thereby achieving enhanced efficiency and security of the document-processing system.

To achieve the foregoing objective, the method using matrix barcode information to process documents is performed by a document-processing apparatus with a first application program installed in the document-processing apparatus and generating matrix barcode information, and the method includes:

establishing a wireless link with a mobile apparatus in the proximity of the document-processing apparatus with the matrix barcode information;

creating a file transfer zone;

determining whether a driving command is received from the mobile apparatus according to the availability of the wireless link;

if the driving command is received, performing a document-scanning procedure to acquire a piece of image information for document and storing the piece of image information for document in the file transfer zone; and wirelessly transmitting the piece of image information for document to the mobile apparatus.

As can be seen from the above-mentioned method, when a user with the mobile apparatus approaches the document-processing apparatus, the first application program in the document-processing apparatus generates the matrix barcode information for the document-processing apparatus to establish the wireless link with the mobile apparatus through the matrix barcode information. Meanwhile, the first application creates the file transfer zone. When receiving the driving command from the mobile apparatus, the document-processing apparatus performs the document-scanning procedure to acquire the piece of image information for document, and further forwards the piece of image information for document through the file transfer zone to the mobile apparatus. Given the matrix barcode information for the document-processing apparatus to be directly controlled by the mobile apparatus for information exchange, the efficiency and security of the document-processing system can be enhanced.

DETAILED DESCRIPTION OF THE INVENTION

Figure 1:
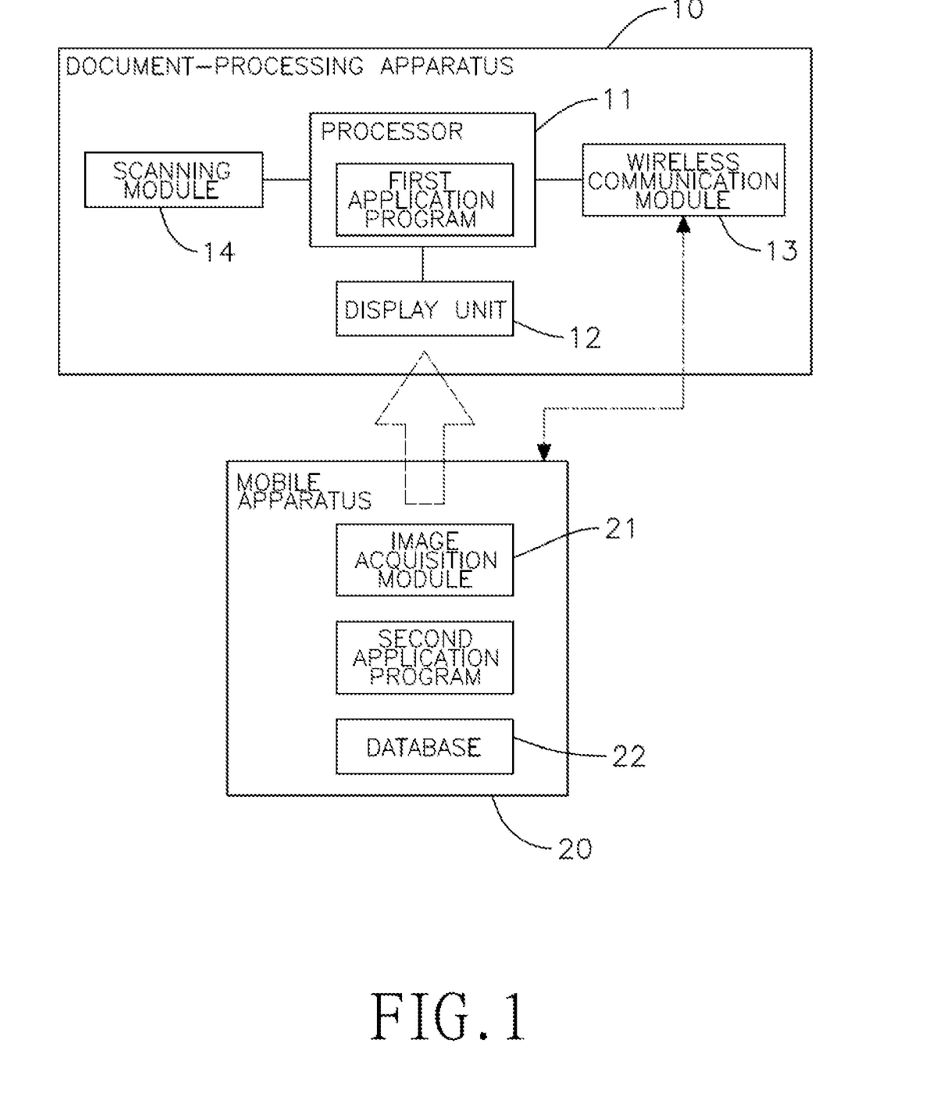
FIG. 1 is a functional block diagram showing system architecture of a first embodiment of a system using matrix barcode information to process document in accordance with the present invention.

With reference to FIG. 1, a first embodiment of a system using matrix barcode information to process document in accordance with the present invention includes a document-processing apparatus 10 and a mobile apparatus 20. The document-processing apparatus 10 is installed at a premise, such as an enterprise, a public or private institution, a school or the like. The document-processing apparatus 10 can be commonly shared by multiple users at the same time or is dedicated to an individual user. Each user only needs to hold the mobile apparatus 20 to approach the document-processing apparatus 10 for direct control over and data exchange with the document-processing apparatus 10. In the present embodiment, the mobile apparatus 20 is a mobile phone, a tablet PC, a notebook computer or the like.

With further reference to FIG. 1, the document-processing apparatus 10 has a processor 11, a display unit 12, a wireless communication module 13 and a scanning module 14. The processor 11 is electrically connected to the display unit 12, the wireless communication module 13, and the scanning module 14 and has a first application program installed therein. When the document-processing apparatus 10 receives an activation signal, the processor 11 executes the first application program to let the first application program generate matrix barcode information to be displayed by the display unit 12.

Figure 2:
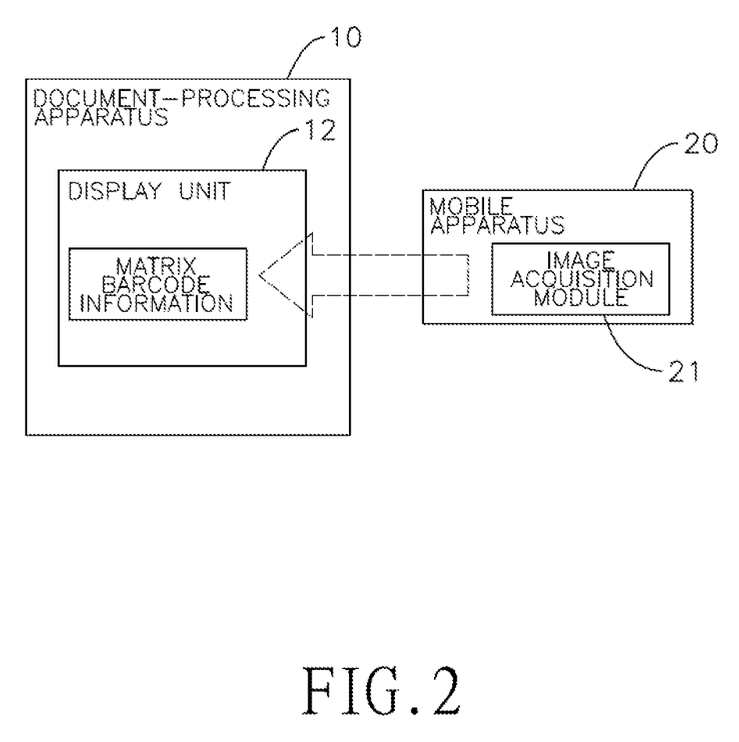
FIG. 2 is a functional block diagram showing an application using the system in FIG. 1.

Moreover, in the present embodiment, the mobile apparatus 20 is connected to a network to download a second application program through the network. The second application program may correspond to the first application program. The mobile apparatus 20 further has an image acquisition module 21 and a database. With reference to FIGS. 1 and 2, when executing the second application program in the mobile apparatus 20, the user drives the image acquisition module 21 through the second application program to acquire the matrix barcode information displayed by the document-processing apparatus 10. The second application program of the mobile device 20 then analyzes the matrix barcode information to acquire a piece of exclusive connection information. In the present embodiment, the piece of connection information includes account information, password information and address information. The mobile apparatus 20, according to the piece of connection information, transmits a wireless signal to the wireless communication module 13 of the document-processing apparatus 10 based on a wireless protocol to establish a wireless link with the wireless communication module 13 of the document-processing apparatus 10.

The matrix barcode information in the present embodiment is constituted by a quick response code (QR code). Because of the inclusion of numbers, texts, symbols, byte and the like, the QR code may be used to constitute information, such as web address, text message, phone number, wireless log-in account/password, and the like. Owing to fast speed in encoding and decoding the matrix barcode information, high efficiency and enhanced operational convenience can be secured upon the use of the matrix barcode information.

When the mobile apparatus 20 uses the matrix barcode information to establish the wireless link with the document-processing apparatus 10, the first application program of the document-processing apparatus 10 creates a file transfer zone. When the wireless communication module 13 of the document-processing apparatus 10 receives a driving command sent from the mobile apparatus 20, the first application program of the document-processing apparatus 10 drives the scanning module 14 through the processor 11 according to the driving command to perform a corresponding automatic document-processing action. In the present embodiment, the automatic document-processing action includes a document-scanning procedure which generates at least one piece of image information for document, stores the at least one piece of image information in the file transfer zone, and instantly transmits the at least one piece of image information to the database 22 of the mobile apparatus 20 via the wireless communication module 13.

Figure 3:
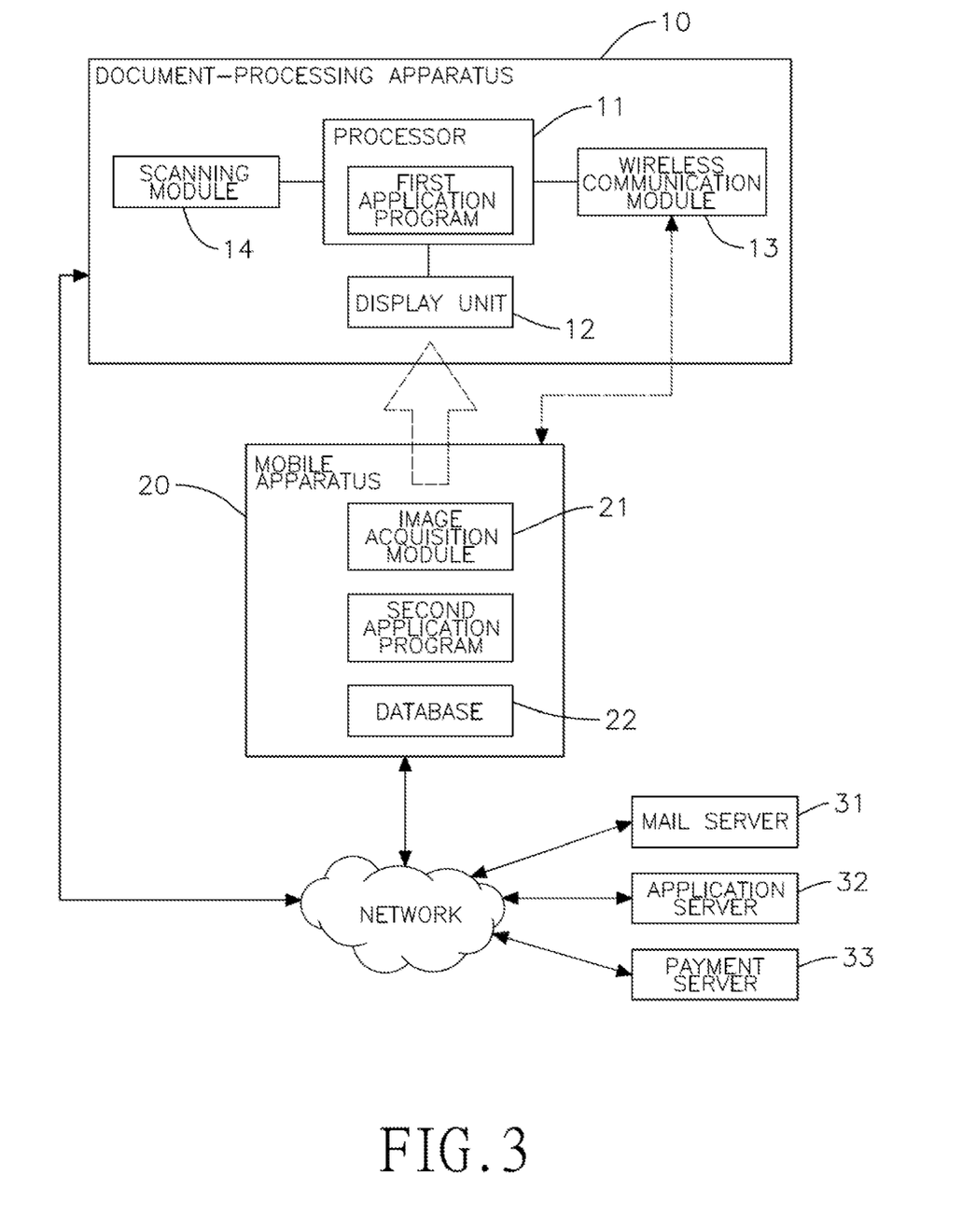
FIG. 3 is a functional block diagram showing system architecture of the system in FIG. 1.

Furthermore, with reference to FIG. 3, in the present embodiment, the system using matrix barcode information to process document further includes a mail server 31, an application server 32, and a payment server 33. The document-processing apparatus 10 is connected to the mail server 31, the application server 32 and the payment server 33 through the network. The user can configure a set of setting parameters and scheduling information in the mobile apparatus 20 or the document-processing apparatus 10 beforehand. The set of setting parameters includes a quantity of document, a size of image, image rotation, image clipping, two-sided image, image quality and the like.

The scheduling information includes a mail-forwarding command, a cloud storage command, a classified storage command, or a payment command. After completing the automatic document-processing action, the document-processing apparatus 10 performs corresponding subsequent actions according to the scheduling information. When the scheduling information is the mail-forwarding command, the document-processing apparatus 10 transfers the at least one piece of image information for document stored in the file transfer zone to the mail server 31 through the network, such that the user can log in the mail server 31 to retrieve the at least one piece of image information for document or transfer the at least one piece of image information for document to other users for enhancement of users' operational convenience.

When the scheduling information is the cloud storage command, the document-processing apparatus 10 forwards the at least one piece of image information for document stored in the file transfer zone to the application server 32 through the network, such that the user can utilize the application server 32 to duplicate the at least one piece of image information for document or further transfer the at least one piece of image information for document to other users for enhancement of users' convenience in information management.

When the scheduling information is the classified storage command, the document-processing apparatus 10 stores the at least one piece of image information for document in a corresponding information directory in the file transfer zone according to attributes or parameters of the at least one piece of image information for document or transfers the at least one piece of image information for document to the mobile apparatus 20 for the second application program of the mobile apparatus 20 to store the at least one piece of image information for document in a corresponding information directory in the database 22 of the mobile apparatus 20 according to the attributes or the parameters of the at least one piece of image information for document for further enhancement of convenience in information management.

When the scheduling information is the payment command, the document-processing apparatus 10 issues a payment request to the payment server 33 to complete a payment procedure through the payment server 33.

Figure 4:
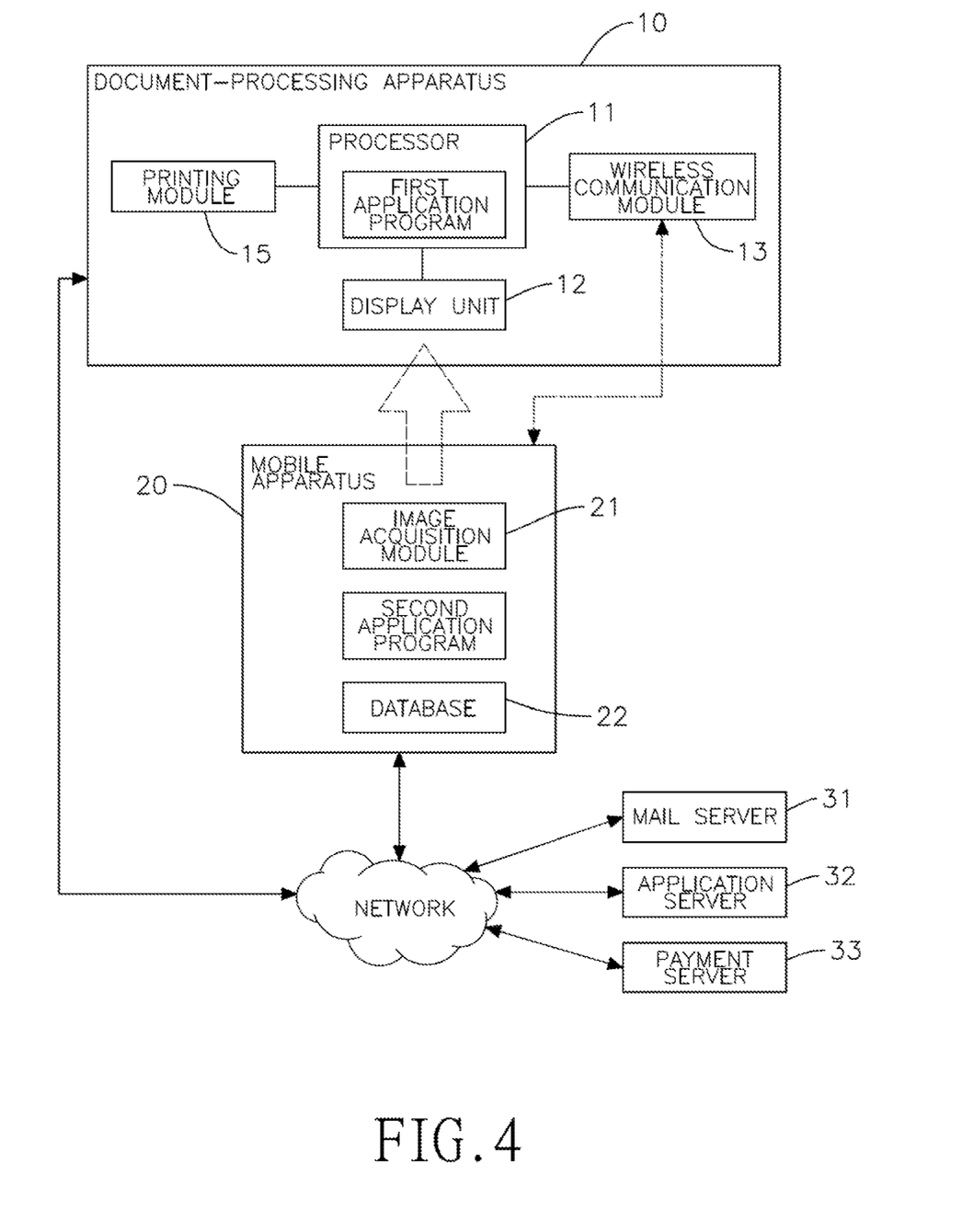
FIG. 4 is a functional block diagram showing system architecture of a second embodiment of a system using matrix barcode information to process document in accordance with the present invention.

With reference to FIG. 4, a second embodiment of a system using matrix barcode information to process document in accordance with the present invention differs from the foregoing embodiment in providing a printing module 15 in place of the scanning module 14 in the foregoing embodiment. The processor 11 is electrically connected to the printing module 15.

In the present embodiment when the mobile apparatus 20 establishes the wireless link with the document-processing apparatus 10 through the matrix barcode information, the first application program of the document-processing apparatus 10 creates the file transfer zone. When the wireless communication module 13 of the document-processing apparatus 10 receives the driving command and at least one piece of image information for document sent from the mobile apparatus 30. The first application program of the document-processing apparatus 10 instantly stores the at least one piece of image information for document in the file transfer zone and drives the printing module 15 through the processor 11 according to the driving command to perform another corresponding automatic document-processing action, which includes a document-printing procedure.

Figure 5:
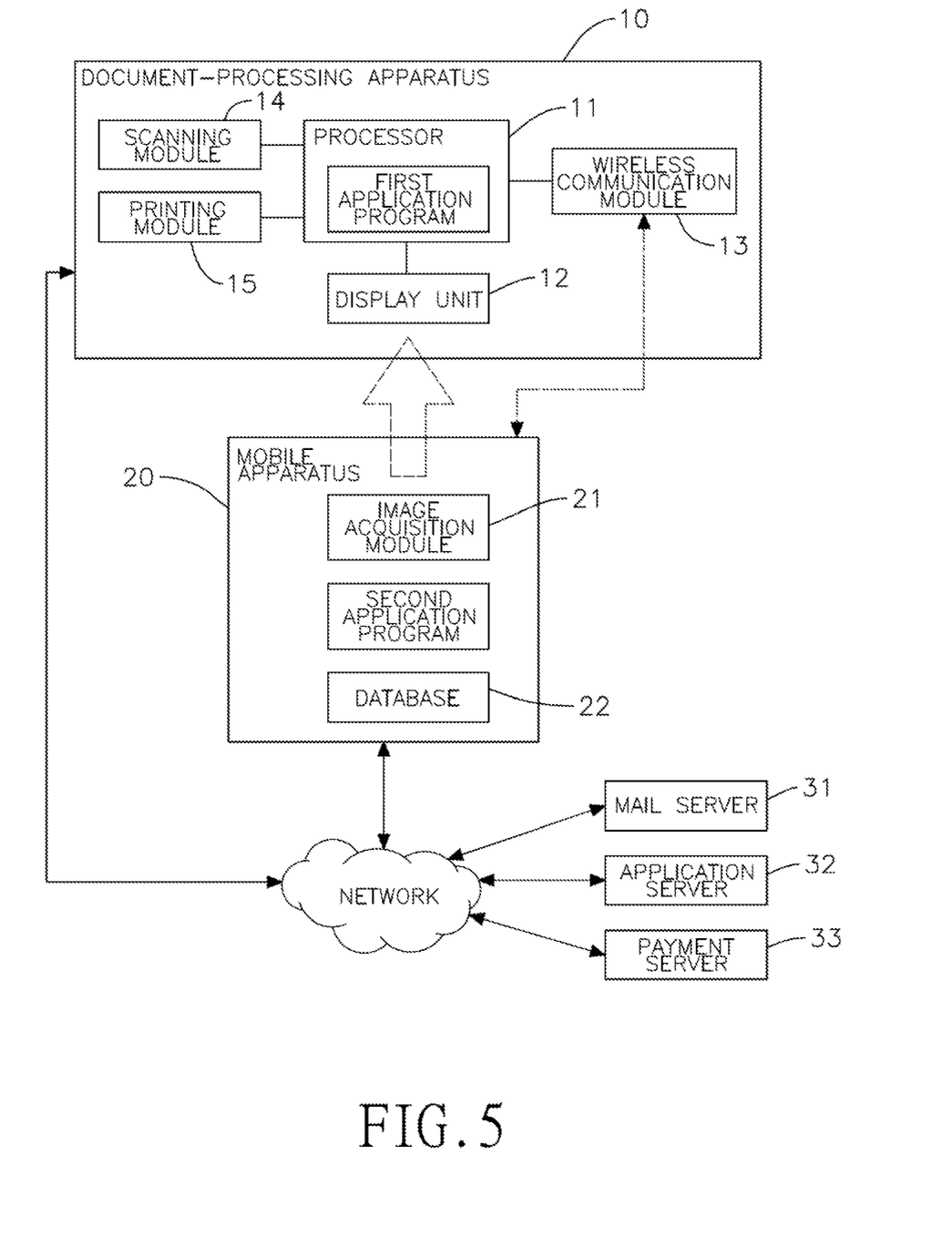
FIG. 5 is a functional block diagram showing system architecture of a third embodiment of a system using matrix barcode information to process document in accordance with the present invention.

With reference to FIG. 5, a third embodiment of a system using matrix barcode information to process document in accordance with the present invention differs from the foregoing embodiments in that the document-processing apparatus 10 has both the scanning module 14 and the printing module 15. The processor 11 is electrically connected to the scanning module 14 and the printing module 15 to constitute an MFP. In the present embodiment the document-processing apparatus 10 can provide a two-way automatic document-processing action, which includes the foregoing document-scanning procedure and the document-printing procedure.

The foregoing embodiments are involved with the document-processing apparatus 10 directly controlled by the user's mobile apparatus 20 through the use of the matrix barcode information to attain information exchange, the automatic document-processing action, and subsequent scheduled actions for assurance of efficiency and security of the document-processing system.

Figure 6:
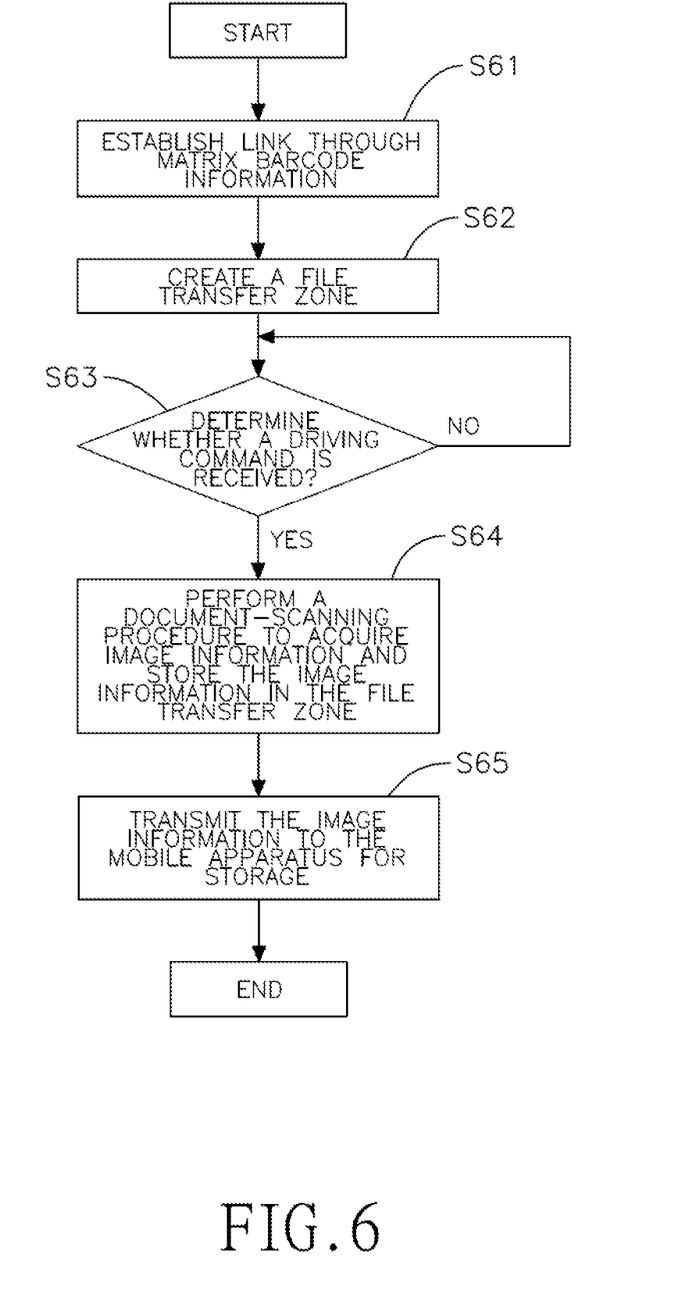
FIG. 6 is a flow diagram of a method using matrix barcode information to process document in accordance with the present invention.

With reference to FIG. 6, a method using matrix barcode information to process documents that is deduced from the foregoing embodiments and the actual applications is shown. The method is performed by the document-processing apparatus 10 with the first application program capable of generating the matrix barcode information installed in the document-processing apparatus 10 and includes the following steps.

Step S61: Provide the matrix barcode information to establish a wireless link with the mobile apparatus 20 in the proximity of the document-processing apparatus 10. In the present embodiment a user can hold the mobile apparatus 20 to capture the matrix barcode information for analysis so as to acquire the piece of exclusive connection information. The mobile apparatus 20 further transmits a wireless signal to the wireless communication module 13 of the document-processing apparatus 10 based on a wireless protocol to establish a wireless link with the wireless communication module 13 of the document-processing apparatus 10.

Step S62: Create a file transfer zone. The file transfer zone is created through the first application program of the document-processing apparatus 10.

Step S63: Determine whether a driving command is received from the mobile apparatus 20 in the nearby according to the availability of the wireless link established to the mobile apparatus 20. If the determination result is positive, perform step S64. Otherwise, resume step S63.

Step S64: Perform a document-scanning procedure to acquire a piece of image information for document and store the piece of image information for document in the file transfer zone.

Step S65: Wirelessly transmit the piece of image information for document to the mobile apparatus 20 for storage in the database 22 of the mobile apparatus 20.

When the user holds the mobile apparatus 20 to approach the document-processing apparatus 10, the first application program of the document-processing apparatus 10 generates the matrix barcode information. In the present embodiment, the matrix barcode information is constituted by a QR code. The document-processing apparatus 10 establishes the wireless link with the mobile apparatus 20 in the nearby through the matrix barcode information. Meanwhile, the first application program creates the file transfer zone. When receiving the driving command from the mobile apparatus 20, the document-processing apparatus 10 performs the document-scanning procedure to acquire the piece of image information for document and transfers the piece of image information for document through the file transfer zone to the mobile apparatus 20 of the user.

Figure 7:
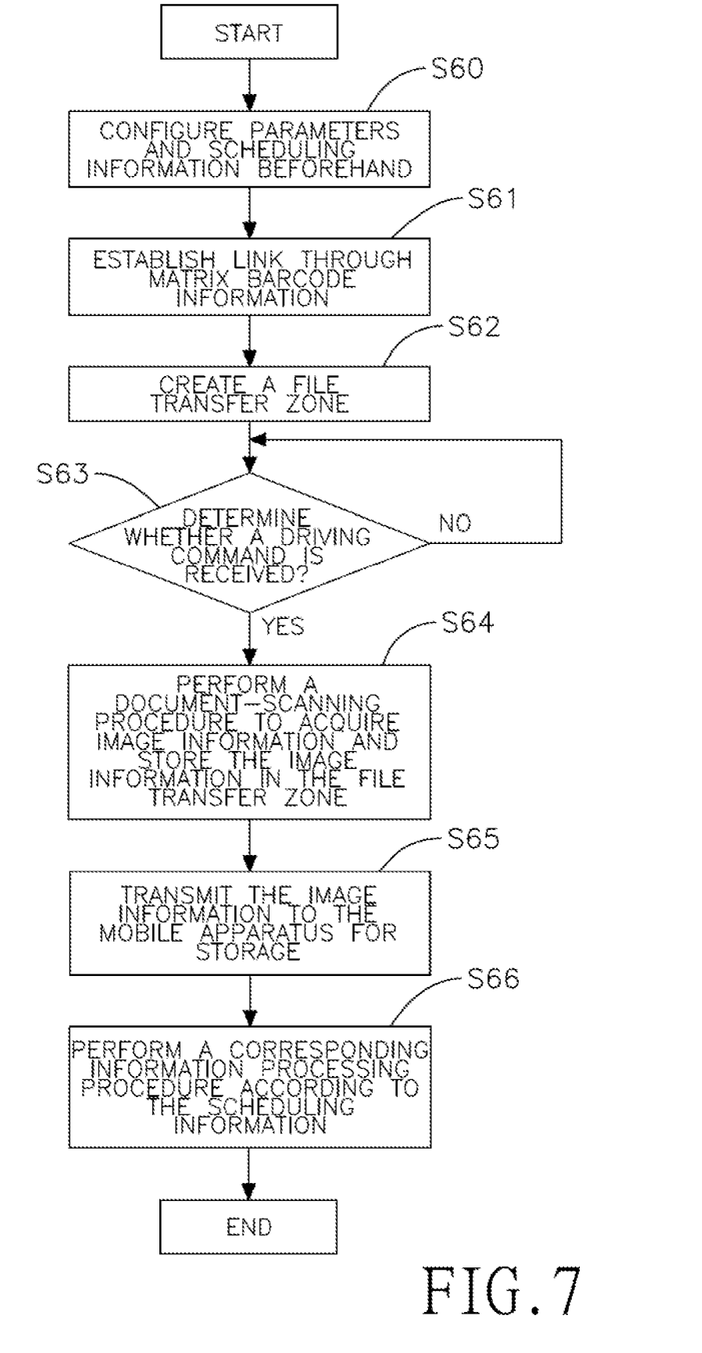
FIG. 7 is a flow diagram of another method using matrix barcode information to process document in accordance with the present invention.

Additionally, with reference to FIG. 7, the method using matrix barcode information to process documents further includes the following steps.

Step S60: Configure a set of setting parameters and scheduling information beforehand in the document-processing apparatus 10 or the mobile apparatus 20. Step S60 is added prior to step S61.

Step S66: Perform a corresponding information processing procedure according to the set of setting parameters and the scheduling information configured beforehand in the document-processing apparatus 10 or the mobile apparatus 20.

In the present embodiment the information processing procedure further includes a mail-forwarding procedure, a cloud storage procedure, a classified storage procedure, and a payment procedure. By virtue of execution of the information processing procedure, the convenience in operation and information management can be enhanced and payment procedure can be simplified.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system using matrix barcode information to process documents, comprising:
   a document-processing apparatus having a first application program installed therein to generate matrix barcode information; and
   a mobile apparatus having a second application program installed therein to capture the matrix barcode information and to establish a wireless link with the document-processing apparatus;
   wherein the first application program of the document-processing apparatus creates a file transfer zone after the mobile apparatus establishes the wireless link with the document-processing apparatus, performs a corresponding automatic document-processing action according to a driving command received from the mobile apparatus, generates at least one piece of image information for a document by a document-scanning procedure, stores the at least one piece of image information in a different corresponding information directory in the file transfer zone for the document according to an attribute or a parameter of the at least one piece of image information for the document and instantly performs information exchange with the mobile apparatus connected through the file transfer zone.

2. The system as claimed in claim 1, wherein the document-processing apparatus includes:
   a display unit;
   a wireless communication module;
   a scanning module; and
   a processor electrically connected to the display unit, the wireless communication module and the scanning module, and having the first application program installed therein to display the matrix barcode information on the display unit, receive the driving command from the wireless communication module, and drive the scanning module through the processor to perform the automatic document-processing action, wherein the automatic document-processing action includes the document-scanning procedure generating the at least one piece of image information for document and instantly transmitting the at least one piece of image information for document to the mobile apparatus through the wireless communication module.

3. The system as claimed in claim 2, wherein the mobile apparatus includes an image acquisition module and a database, captures the matrix barcode information through the image acquisition module, and stores the at least one piece of image information for document in the database.

4. The system as claimed in claim 1, further comprising a mail server, an application server, and a payment server, wherein the document-processing apparatus is connected to the mail server, the application server and the payment server through a network, and performs subsequent corresponding scheduled actions according to received scheduling information.

5. The system as claimed in claim 1, wherein the document-processing apparatus includes:
   a display unit;
   a wireless communication module;
   a printing module; and
   a processor electrically connected to the display unit, the wireless communication module and the printing module, and having the first application program installed therein to display the matrix barcode information on the display unit, receive the driving command and the at least one piece of image information for document from the wireless communication module, store the at least one image information for document in the file transfer zone, and drives the scanning module through the processor to perform the automatic document-processing action, wherein the automatic document-processing action includes a document-printing procedure.

6. The system as claimed in claim 1, wherein the document-processing apparatus includes:
   a display unit;
   a wireless communication module;
   a scanning module;
   a printing module; and
   a processor electrically connected to the display unit, the wireless communication module, the scanning module, and the printing module to constitute a multi-function peripheral, and having the first application program installed therein, display the matrix barcode information on the display unit, and receive the driving command through the wireless communication module;
   wherein
   the document-processing apparatus provides a two-way automatic document-processing action including the document-scanning procedure and a document-printing procedure;
   when performing the document-scanning procedure, the processor drives the scanning module to generate the at least one piece of image information for document and transmits the at least one piece of image information for document to the mobile apparatus through the wireless communication module;
   when performing the document-printing procedure, the processor receives the driving command and the at least one piece of image information for document through the communication module, stores the at least one piece of image information for document in the file transfer zone, and drives the printing module to print out the at least one piece of image information for document.

7. The system as claimed in claim 1, wherein the second application program in the mobile apparatus analyzes the matrix barcode information to acquire a piece of connection information, and the mobile apparatus establishes the wireless link with the document-processing apparatus according to the piece of connection information.

8. The system as claim in claim 7, wherein the piece of connection information includes account information, password information and address information, and the mobile apparatus establishes the wireless link with the document-processing apparatus according to the piece of connection information based on a wireless protocol.

9. The system as claimed in claim 1, wherein the matrix barcode information is constituted by a quick response code (QR code) including numbers, texts, symbols and bytes, and the QR code is used to constitute information including web address, text message, phone number, and wireless log-in account or password.

10. A method using matrix barcode information to process documents, wherein the method is performed by a document-processing apparatus with a first application program installed in the document-processing apparatus and generating matrix barcode information, the method comprising:
  establishing a wireless link with a mobile apparatus in the proximity of the document-processing apparatus with the matrix barcode information;
  creating a file transfer zone after the mobile apparatus establishes the wireless link with the document-processing apparatus;
  determining whether a driving command is received from the mobile apparatus according to the availability of the wireless link;
  if the driving command is received, performing a document-scanning procedure to acquire a piece of image information for a document and storing the piece of image information for the document in a different corresponding information directory in the file transfer zone according to an attribute or a parameter of the at least one piece of image information for the document; and
  wirelessly transmitting the piece of image information for the document to the mobile apparatus connected through the file transfer zone.

11. The method as claimed in claim 10, further comprising a step of configuring a set of setting parameters and scheduling information beforehand before the step of establishing a wireless link with a mobile apparatus.

12. The method as claimed in claim 11, further comprising a step of performing a corresponding information processing procedure according to the set of setting parameters and the scheduling information.

13. The method as claimed in claim 12, wherein the information processing procedure includes a mail-forwarding procedure that transfers the piece of image information for document stored in the file transfer zone to a mail server through a network for a user to log in the mail server to retrieve the at least one piece of image information for document or transfer the at least one piece of image information for document to other users.

14. The method as claimed in claim 12, wherein the information processing procedure includes a cloud storage procedure that forwards the piece of image information for document stored in the file transfer zone to an application server through a network for a user to utilize the application server to duplicate the piece of image information for document or further transfer the piece of image information for document to other users.

15. The method as claimed in claim 12, wherein the information processing procedure includes a classified storage procedure that stores the piece of image information for document in a corresponding information directory in the file transfer zone.

16. The method as claimed in claim 12, wherein the information processing procedure includes a payment procedure that issues a payment request to a payment server to complete the payment procedure through the payment server.

17. The method as claimed in claim 10, wherein the mobile apparatus analyzes the matrix barcode information to acquire a piece of connection information and establishes a wireless link with the document-processing apparatus according to the piece of connection information.

18. The method as claimed in claim 17, wherein the piece of connection information includes account information, password information and address information.

19. The method as claimed in claim 10, wherein the matrix barcode information is constituted by a quick response code (QR code) including numbers, texts, symbols and bytes, the QR code is used to constitute information including web address, text message, phone number, and wireless log-in account or password.

* * * * *